United States Patent
Poulsen et al.

(10) Patent No.: US 12,134,326 B2
(45) Date of Patent: Nov. 5, 2024

(54) CHARGING STATION POWER SHARING SYSTEM AND METHOD

(71) Applicant: Rivian IP Holdings, LLC, Plymouth, MI (US)

(72) Inventors: Christopher S. Poulsen, San Francisco, CA (US); Trent C. Warnke, Novi, MI (US); Michael P. Slattery, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 944 days.

(21) Appl. No.: 17/071,453

(22) Filed: Oct. 15, 2020

(65) Prior Publication Data

US 2022/0118863 A1    Apr. 21, 2022

(51) Int. Cl.
| | | |
|---|---|---|
| B60L 53/10 | (2019.01) | |
| B60L 53/31 | (2019.01) | |
| B60L 53/66 | (2019.01) | |

(52) U.S. Cl.
CPC ............... B60L 53/10 (2019.02); B60L 53/31 (2019.02); B60L 53/665 (2019.02)

(58) Field of Classification Search
CPC .. H02J 50/12; H02J 50/90; H02J 50/70; H02J 50/80; H02J 50/60; H02J 7/0047; H02J 50/50; H02J 7/0048; H02J 7/0042; H02J 7/35; H02J 7/00304; H02J 7/00034; H02J 50/005; H02J 50/402; H02J 2310/48; H02J 50/20; H02J 7/0013; H02J 7/00; H02J 7/34; H02J 2310/40; H02J 7/007182;

(Continued)

(56) References Cited

U.S. PATENT DOCUMENTS

2010/0096926 A1   4/2010   King et al.
2012/0233062 A1*  9/2012   Cornish ................. B60L 53/35
                                                              700/275

(Continued)

FOREIGN PATENT DOCUMENTS

CN        109177772 A      1/2019

OTHER PUBLICATIONS

First Office Action and Search Report on CN Appl. No. 202110864245.9 dated Feb. 8, 2024, with machine translation.

(Continued)

*Primary Examiner* — Binh C Tat
(74) *Attorney, Agent, or Firm* — Foley & Lardner LLP

(57) ABSTRACT

Various disclosed embodiments include illustrative charging systems, electrical dispensers, methods of charging a vehicle, and methods of providing charging power to a vehicle. In various embodiments, an illustrative electric vehicle charging system includes a power cabinet having at least two direct current (DC) power outputs. The electric vehicle charging system also, includes a power cabinet controller configured to control delivery of electrical power to each of the at least two DC power outputs individually. The electric vehicle charging system further includes a processor in communication with the controller and configured to receive information related to authorizing delivery of electrical power to at least one of the at least two DC power outputs, the delivery of electrical power including a power level and a duration for each of the at least two DC power outputs.

20 Claims, 2 Drawing Sheets

(58) Field of Classification Search
CPC .......... H02J 7/04; H02J 2300/28; H02J 3/322; H02J 7/00045; H02J 50/05; H02J 50/10; H02J 7/00309; H02J 50/502; H02J 7/0045; H02J 50/40; H02J 7/0029; H02J 50/30; H02J 3/381; H02J 50/15; H02J 3/388; H02J 4/00; H02J 2300/10; H02J 2300/30; H02J 3/00; H02J 3/32; H02J 3/38; H02J 7/00714; H02J 1/102; H02J 1/14; H02J 2300/24; H02J 2300/40; H02J 3/28; H02J 7/0044; H02J 7/02; H02J 13/00002; H02J 13/00004; H02J 13/00034; H02J 15/00; H02J 2203/20; H02J 2207/40; H02J 2300/20; H02J 2300/22; H02J 2310/10; H02J 2310/12; H02J 2310/16; H02J 2310/60; H02J 3/004; H02J 3/14; H02J 3/46; H02J 7/0018; H02J 7/342; H02J 9/06; H02J 9/062; H02J 9/065; H02J 2207/20; H02J 2310/23; H02J 50/23; H02J 7/00302; H02J 7/0031; H02J 7/0036; H02J 7/00712; H02J 7/345; B60L 2250/16; B60L 2210/40; B60L 53/126; B60L 53/80; B60L 8/00; B60L 2200/40; B60L 1/006; B60L 53/34; B60L 58/40

USPC .................................................. 320/106–115
See application file for complete search history.

(56) References Cited

U.S. PATENT DOCUMENTS

| | | |
|---|---|---|
| 2013/0002197 A1 | 1/2013 | Hernandez et al. |
| 2013/0049677 A1 | 2/2013 | Bouman |
| 2013/0257146 A1 | 10/2013 | Nojima et al. |
| 2014/0062401 A1 | 3/2014 | Gadh et al. |
| 2014/0067660 A1* | 3/2014 | Cornish .................. B60L 53/35 |
| | | 705/39 |
| 2015/0346698 A1 | 12/2015 | Mailloux et al. |
| 2017/0057369 A1* | 3/2017 | Næsje ..................... B60L 53/66 |
| 2017/0274792 A1* | 9/2017 | Vaughan ................. B60L 53/18 |
| 2018/0001776 A1* | 1/2018 | Kim ....................... B60L 53/14 |
| 2018/0001781 A1* | 1/2018 | Quattrini, Jr ......... B60L 53/665 |

OTHER PUBLICATIONS

Second Office Action on CN Appl. No. 202110864245.9 dated Jun. 17, 2024, with machine translation, 6 pages.

* cited by examiner

CHARGING STATION POWER SHARING SYSTEM AND METHOD

INTRODUCTION

The present disclosure relates to charging of electrical vehicles.

The statements in this section merely provide background information related to the present disclosure and may not constitute prior art.

With widespread use of electric vehicles comes greater need for charging resources and standardization. Electric Vehicle Supply Equipment (EVSE) is one standard used for vehicle charging equipment. A standard EVSE power cabinet is limited in the number of dispensers it can connect to. Limitations can include the number of power modules in the cabinet, the required power output of the dispensers, or the power cabinet size.

Electric Vehicle (EV) charging hardware generally caters to two use cases: long stays such as parking overnight at home or at a hotel, or short stays such as stopping to charge while on a road trip. Level 2 (L2) infrastructure at 3-7 kW typically caters to home charging, overnight charging, or other very long stays while Level 3 (L3) charging at 100-350 kW is focused on charging as fast as possible However, a third use-case exists for medium stay parking sessions such as going to a mall, seeing a movie, going on a hike, or skiing a half-day. During these medium stays of 2-4 hrs, L2 charging is not powerful enough to make any substantial impact to a large modern EV battery of >105 kWh, and L3 infrastructure inconveniently requires drivers to move their vehicles when they are done charging and puts unnecessary strain on EV batteries Modern day L3 chargers located at destination locations such as shopping malls (such as Tesla Superchargers) can become especially inconvenient if the driver's intended stay is 2-4 hrs by requiring a car to be moved after 30-45 mins when it is finished charging. Alternatively, while taking a 2-3 hr hike a driver will be unable to return to the driver's vehicle to move off of a charger after 30-45 minutes and would either need to alter hiking plans or wait to charge after returning from the hike.

At present, DC fast charging hardware is targeted at short stay use cases. Current hardware requires drivers to charge EVs at the maximum rate available at the charger being used and does not give drivers the option to charge at a slower rate even if that would be more convenient to the driver.

BRIEF SUMMARY

Various disclosed embodiments include illustrative charging systems, electrical dispensers, methods of charging a vehicle, and methods of providing charging power to a vehicle.

In an illustrative embodiment, an electric vehicle charging system includes a power cabinet having at least two direct current (DC) power outputs. The electric vehicle charging system also, includes a power cabinet controller configured to control delivery of electrical power to each of the at least two DC power outputs individually. The electric vehicle charging system further includes a processor in communication with the controller and configured to receive information related to authorizing delivery of electrical power to at least one of the at least two DC power outputs, the delivery of electrical power including a power level and a duration for each of the at least two DC power outputs.

In another illustrative embodiment, an electric vehicle power charging cabinet includes at least two direct current (DC) power outputs. The power charging cabinet includes a power cabinet controller configured to control delivery of electrical power to each of the at least two DC power outputs individually. The power charging cabinet further includes a processor in communication with the controller and configured to receive information related to authorizing delivery of electrical power to at least one of the at least two DC power outputs, the delivery of electrical power including a power level and a duration for each of the at least two DC power outputs.

In another illustrative embodiment, a method of charging a vehicle includes receiving, by a processor of a power cabinet having more than one power output, an authorization from a payment server to provide electrical power to a selected one of the more than one power outputs at a selected power level. The method also includes providing electrical power to the selected power output at the selected power level.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
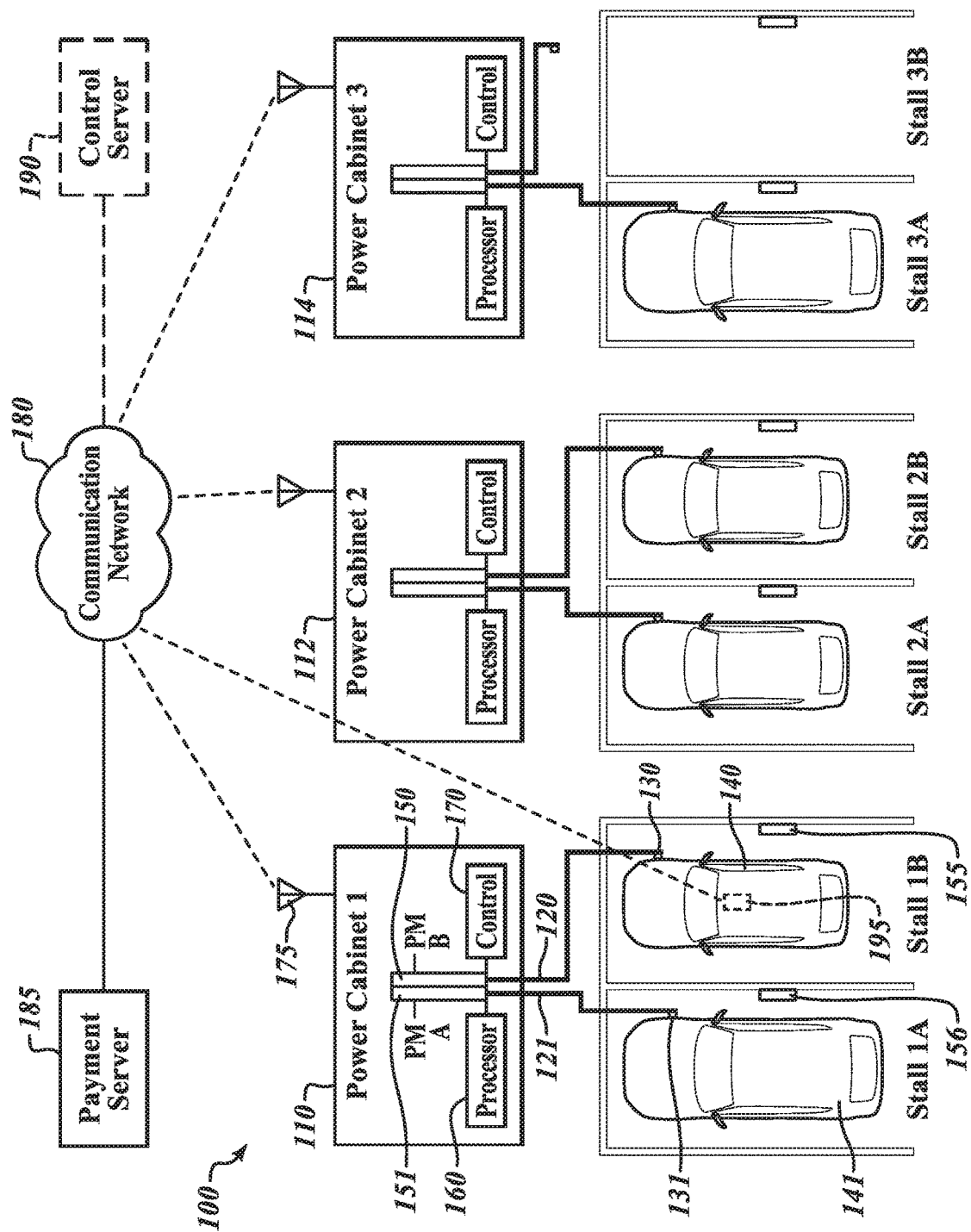
FIG. 1 is a block diagram of an illustrative electric vehicle charging system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative charging systems, electrical dispensers, methods of charging a vehicle, and methods of providing charging power to a vehicle.

It will be appreciated that various disclosed charging systems, equipment, and methods create the ability to tailor charging speed to driver preferences through a flexible billing and power delivery platform. The subject matter herein is designed to cater to medium duration use cases. As such, it is not intended to supply a full 200 kW to every station at the same time. Power sharing allows a station to service more stalls than the number of (in this case 200 kW) power cabinets that are installed. For example, if the station has 20 stalls it may only have 10 power cabinets installed to service those 20 stalls. A "normal" fast charging station of today would typically feature the same number of cabinets as it has plugs. In this example that would mean installing 20×200 kW cabinets. However, with the proposed design of various disclosed embodiments, the station would only need 10×200 kW cabinets as it is not designed to supply a full 200 kW to every plug simultaneously. This creates a very substantial cost savings of installation of tens of thousands of dollars at today's hardware prices.

Referring now to FIG. 1, an illustrative electric vehicle charging system 100 includes a power cabinet 110 having at least two direct current (DC) power outputs 120 and 121. The power cabinet 110 may be a fast charging power cabinet, such as but not limited to an L2 or L3 power cabinet. The power cabinet 110 may include two or more power modules 150 and 151 coupled to the power outputs 120 and 121 respectively. The power cabinet 110 may include a power cabinet controller 170 configured to control delivery of electrical power to each of the at least two DC power outputs 120 and 121 individually. A processor 160 may be in communication with the controller 170 and configured to receive information related to authorizing delivery of electrical power to at least one of the at least two DC power outputs 120 and 121. The delivery of electrical power includes a power level and a duration for each of the at least two DC power outputs 120 and 121. In various embodiments, a control server 190 may be used to provide power distribution control in a centralized way instead of a local way to each of a set of power cabinets, such as but not limited to power cabinets 110, 112, and 114, which have the same or similar capabilities to power cabinet 110.

The power outputs 120 and 121 are coupled with charging connectors 130 and 131 which may be any variety of vehicle charging connectors including but not limited to EVSE vehicle charging connectors or combined charging system (CCS) connectors. Each of the power outputs 120 and 121 may be configured to deliver any of a variety of power levels. In some examples, the power outputs 120 and 121 may be configured to deliver power levels up to at least 200 KW. A processor 160 of the power cabinet 110 is configured to schedule delivery of electrical power to either of the first or second power outputs 120 or 121. The processor 160 may also indicate to the controller 170 the level of power to deliver to either of the electrical power outlets 120 or 121. In some embodiments a payment interface 155 may be configured at or near the power cabinet 110, which delivers payment information through a communication interface 175 to a communications network 180 and communicates the payment information with a payment server 185. In various embodiments the payment server 185 is configured to enable accepting payments in exchange for power delivery to one of the at least one DC power outputs. In other embodiments, any of various ways may be used to communicate with the payment server 185 including, but not limited to a mobile phone 195 which may be that of an occupant of the vehicle 140.

In operation, the vehicle 140 may pull into a stall 1B and the operator may connect the vehicle's power inlet to the charging connector 130. The operator may then place an order through the payment interface 155, or through another payment interface such as one on the mobile phone 195. An order for power to be delivered may include at least one of a time, duration, and power level to be delivered to the vehicle. A second vehicle 141 may pull into a stall 1A and connect to a charging connector 131. The operator of the vehicle 141 may make a payment to request power delivery through a payment interface 156 or any variety of ways of communicating with the payment server 185. With both vehicles 140 and 141 requesting power, the processor 160 may be configured to make decisions of how to deliver the power to each of the vehicles. This may include but is not limited to scheduling of the power delivery to each vehicle and deciding on what power level to deliver to each vehicle.

The bay-style power sharing station (that is, the power cabinet 110 with stalls 1A and 1B) enables a medium stay use case that is not met by current L2 or L3 infrastructure. The system 100 may allow customers to pay less to charge slower and to allow medium duration parking. For example, a flexible billing structure coupled with high-powered EV charging hardware may be implemented where the customers can pay a premium rate to charge as quickly as possible (that is, 200 kW) or pay a base rate to charge at medium speeds (such as 25-50 kW). In accordance with various embodiments, both hardware and billing platforms may be configured to work in tandem to provide operators with high-powered charging as an option when they wish to stop and charge for as short a time as possible and medium-powered charging when they voluntarily plan to stay longer. For example, in some embodiments an operator paying a premium rate is entitled to draw the maximum power output of the charger they are on and any driver paying the base rate is entitled to draw a lower output (shown in the drawing as 50 kW). Also, in various embodiments, when drivers are finished charging, they will be given a grace period to move their vehicles and will thereafter be billed a penalty fee per minute for occupying a charger without charging.

Figure 2:
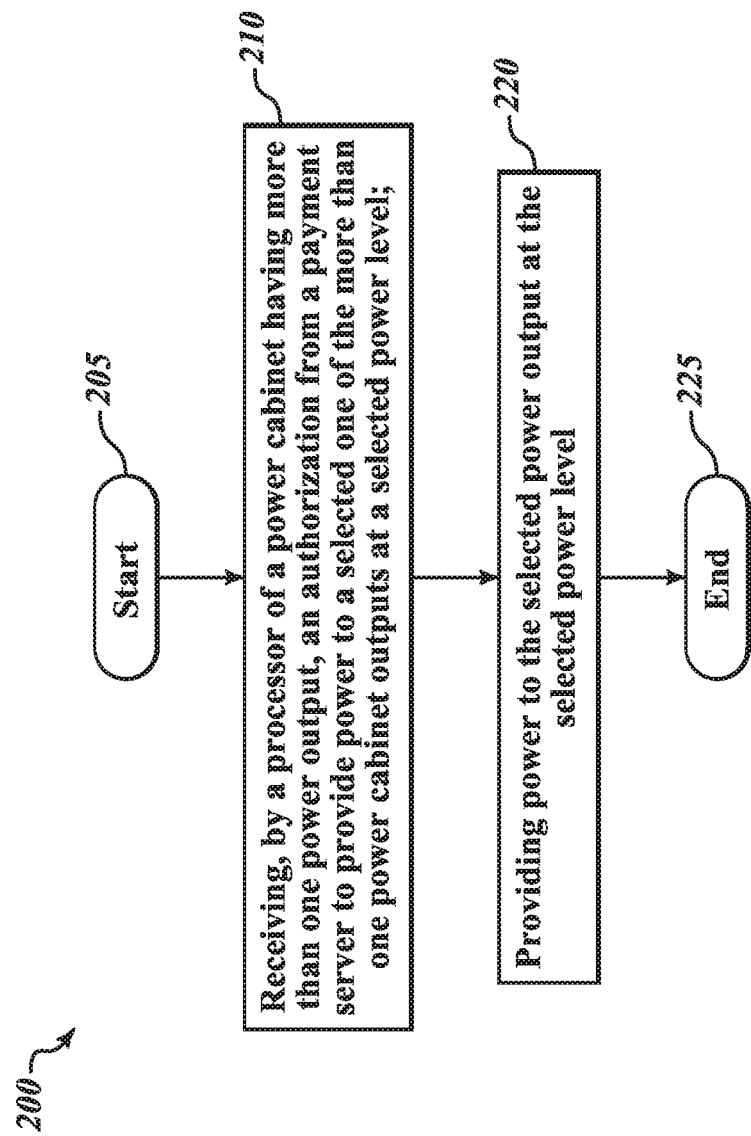
FIG. 2 is a flowchart of an illustrative method of charging a vehicle.

Referring now to FIG. 2, in various embodiments a method 200 of charging a vehicle 200 is provided. The method 200 starts at a block 205. The method 200 includes at a block 210 receiving, by a processor of a power cabinet having more than one power output, an authorization from a payment server to provide electrical power to a selected one of the more than one power outputs at a selected power level. The method 200 also includes at a block 220 providing electrical power to the selected power output at the selected power level. The method 200 ends at a block 225.

It will be appreciated that utilizing the disclosed systems and methods may help contribute to enabling drivers to charge vehicles more slowly, thereby intentionally prolonging a charging session until a driver may be done with a medium-length activity. Thus, there may be a customer experience benefit to catering charging time to what makes the most sense for the customer given any number of activity durations. It will be appreciated that various disclosed embodiments may help allow charge point providers to help contribute to offering a solution for a wider variety of charging use cases.

In accordance with various embodiments, the mechanism for determining the rate of charge and price may be tied to a dynamic system. For example, an intelligent system which is set at the time of departure (of the activity) would not be locked but would dynamically balance itself as demand changes.

The system may be tied through an internet connection to a phone or connected wearable with location tracking. By way of example, if vehicle 141 comes and needs a faster charge the system could send a message to a user 140, or any other user in a connected charging network that might forego power charging, and see if they would benefit from a slower charge for the lower monetary rate. This ability allows the system to both balance user's preferences and optimize the revenue/profit of the system.

For example, location may be used as one of the factors to determine which vehicle/user in the charging network might be most willing to reconfigure their power consumption based on their ETA back to their vehicle.

Users that are taking longer than anticipated at an activity might benefit from this dynamic change because they would otherwise be "fined" for their late arrival if their vehicle finished charging before they were back. In such a case, they would be happy to slow their charge in exchange for more time. Maybe not even a lower rate.

The communication and approval process may be managed over their smartphone, smartwatch or other connected wearable or portable device.

The system may send out messages that offer to a first to answer, lower price and/or increased charge time or alternatively, offer users to increase their charging rate, when there is extra capacity, for a small fee if they would like to leave earlier than planned.

In some embodiments there may also be a financial benefit to customers who may wish to pay less to recharge their EVs. In such embodiments, price-sensitive customers may be willing to alter travel plans or select certain destinations specifically to use a medium-powered charger at lower cost when compared to traditional DC Fast Charging (DCFC) ultra-fast charging equipment.

Additionally, substantial cost savings may be realized by installing a charging station of this nature. By servicing multiple plugs per power cabinet, the number of power cabinets entailed is reduced.

Medium stay activities may include, but are not limited to mall shopping, movie viewing, and half-day hiking, skiing, biking, and boating. The disclosed embodiments allow for a charging solution for EV users to engage in adventures at adventure locations and removes many of the potential pain points associated with L2 or L3 charging today. Utilizing the disclosed EV users can go on a 2-3 hr hike and charge a 135-kWh battery pack equipped from 20-80% without needing to move their vehicle in the middle of their hike. This is not possible today with either L2 charging (because it is not fast enough to charge from 20-80% in that time) or L3 charging (because it would finish charging before our customer's hike would be over).

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. An electric vehicle charging system comprising:
   a power cabinet having at least two direct current (DC) power outputs switchably coupled with a number of DC power modules which does not exceed a number of the DC power outputs, the DC power modules comprising a first DC power module having a first charging rate and a second DC power module having a second charging rate, different from the first charging rate;
   a power cabinet controller configured to:
      receive, for a first electric vehicle at the charging system, a charging completion time;
      determine, based on the charging completion time, a charging rate for the first electric vehicle;
      select, based on the charging rate, the first DC power module to charge the first electric vehicle;

control delivery of electrical power to each of the at least two DC power outputs individually; and a processor in communication with the controller and configured to receive information related to authorizing delivery of electrical power to at least one of the at least two DC power outputs, the delivery of electrical power including a power level and a duration for each of the at least two DC power outlets.

2. The electric vehicle charging system of claim 1, wherein the controller is configured to:
receive a charging request from a second electric vehicle at the charger;
cause a transmission of a message indicating a cost savings associated with a reduction of charging speed; and
responsive to a receipt of a response to the message:
decouple the first DC power module from the first electric vehicle;
couple the first DC power module with the second electric vehicle; and
couple the second DC power module with the second electric vehicle.

3. The electric vehicle charging system of claim 1, wherein the DC power outputs include combined charging system (CCS) connectors.

4. The electric vehicle charging system of claim 1, comprising the processor in communication with the controller and configured to:
receive an indication of a location of a user;
generate a message to the user, indicating an adjustment to the charging completion time;
responsive to a receipt of a confirmation of the adjustment, cause the controller to:
decouple the first DC power module from the first vehicle;
couple the first DC power module with the second vehicle; and
couple the second DC power module with the second vehicle.

5. The electric vehicle charging system of claim 1, wherein the number of the DC power outputs exceeds the number of the DC power modules.

6. The electric vehicle charging system of claim 1, further comprising:
a payment interface configured to enable accepting payments in exchange for power delivery to one of the at least one power outputs.

7. The electric vehicle charging system of claim 1, wherein the controller is configured to provide electrical power at least two different power levels.

8. The electrical vehicle charging system of claim 6, wherein the payment interface is further configured to enable accepting payments in exchange for power delivery to one of the at least one DC power outputs for a selected duration.

9. The electric vehicle charging system of claim 6, wherein the payment interface is further configured on a mobile device to enable accepting payments in exchange for power delivery to one of the at least one DC power outputs at a selected power level.

10. An electric vehicle power charging cabinet comprising:
at least two direct current (DC) power outputs switchably coupled with a number of DC power modules which does not exceed a number of the DC power outputs, the DC power modules comprising a first DC power module having a first charging rate and a second DC power module having a second charging rate, different from the first charging rate;
a power cabinet controller configured to:
receive, for a first electric vehicle at the charging system, a charging completion time;
determine, based on the charging completion time, a charging rate for the first electric vehicle;
select, based on the charging rate, the first DC power module to charge the first electric vehicle; control delivery of electrical power to each of the at least two DC power outputs individually; and
a processor in communication with the controller and configured to receive information related to authorizing delivery of electrical power to at least one of the at least two DC power outputs, the delivery of electrical power including a power level and duration for each of the at least two DC power outputs.

11. The electric vehicle charging cabinet of claim 10, wherein the controller is configured to:
receive a charging request from a second electric vehicle at the charger;
cause a transmission of a message indicating a cost savings associated with a reduction of charging speed; and
responsive to a receipt of a response to the message:
decouple the first DC power module from the first electric vehicle;
couple the first DC power module with the second electric vehicle; and
couple the second DC power module with the second electric vehicle.

12. The electric vehicle charging cabinet of claim 10, wherein the DC power outputs are configured to be coupled to combined charging system (CCS) connectors.

13. The electric vehicle charging cabinet of claim 10, comprising the processor in communication with the controller and configured to:
receive an indication of a location of a user;
generate a message to the user, indicating an adjustment to the charging completion time;
responsive to a receipt of a confirmation of the adjustment, cause the controller to:
decouple the first DC power module from the first vehicle;
couple the first DC power module with the second vehicle; and
couple the second DC power module with the second vehicle.

14. The electric vehicle charging cabinet of claim 10, number of the DC power outputs exceeds the number of the DC power modules.

15. The electric vehicle charging cabinet of claim 10, wherein the processor is configured to be coupled to a payment interface configured to enable accepting payments in exchange for power delivery to one of the at least one DC power outputs.

16. The electric vehicle charging cabinet of claim 10, wherein the controller is configured to provide electrical power at least two different power levels.

17. The electric vehicle charging system of claim 16, wherein the payment interface is further configured to enable accepting payments in exchange for power delivery to one of the at least one DC power outputs at a selected level.

18. The electric vehicle charging system of claim 16, wherein the payment interface is further configured to enable accepting payments in exchange for power delivery to one of the at least one DC power outputs for a selected duration.

19. A method of charging a vehicle, comprising:
  receiving, for a first electric vehicle at a charging station, a charging completion time by a controller in communication with the charging station comprising at least two direct current (DC) power outputs switchably coupled with a number of DC power modules which does not exceed a number of the DC power outputs, the DC power modules comprising a first DC power module having a first charging rate and a second DC power module having a second charging rate, different from the first charging rate;
  determining, by the controller based on the charging completion time, a charging rate for the first electric vehicle;
  selecting, by the controller and based on the charging rate, the first DC power module to charge the first electric vehicle; and
  receiving, by a processor of a power cabinet having more than one power output, an authorization from a payment server to provide electrical power to a selected one of the more than one power outputs at a selected power level; and providing electrical power to the selected power output at the selected power level.

20. The method of claim 19, comprising:
  receiving, by the controller, a charging request from a second electric vehicle at the charger;
  causing, by the controller, a transmission of a message indicating a cost savings associated with a reduction of charging speed; and
  responsive to a receipt of a response to the message:
    decoupling, by the controller, the first DC power module from the first electric vehicle;
    coupling, by the controller, the first DC power module with the second electric vehicle; and
    coupling, by the controller, the second DC power module with the second electric vehicle.

* * * * *